United States Patent [19]

Ichimura et al.

[11] 4,151,340

[45] Apr. 24, 1979

[54] PROCESS FOR PRODUCING FLUOROCOPOLYMER

[75] Inventors: Masahiko Ichimura; Haruhisa Miyake; Shun-ichi Kodama; Michio Hisasue, all of Yokohama, Japan

[73] Assignee: Asahi Glass Company Ltd., Tokyo, Japan

[21] Appl. No.: 870,098

[22] Filed: Jan. 17, 1978

[30] Foreign Application Priority Data

Feb. 1, 1977 [JP] Japan .................................... 52-9259

[51] Int. Cl.$^2$ .................... C08F 214/24; C08F 214/26
[52] U.S. Cl. .............................. 526/249; 204/159.14; 204/159.22; 260/30.4 R; 260/31.2 R; 260/32.8 R; 260/33.6 F; 260/33.8 F; 428/442; 428/463; 428/500; 526/255
[58] Field of Search .................. 204/159.22; 526/206, 526/249, 255, 309, 332

[56] References Cited

U.S. PATENT DOCUMENTS

| | | | |
|---|---|---|---|
| 2,104,000 | 12/1937 | Reppe et al. | 526/332 |
| 2,834,767 | 5/1958 | Hoyt | 526/255 |
| 3,231,554 | 1/1966 | Kern | 526/255 |
| 3,332,924 | 7/1967 | Van de Castle et al. | 526/332 |
| 3,616,371 | 10/1971 | Ukihashi et al. | 526/255 |
| 3,892,641 | 7/1975 | Tabata et al. | 526/255 |

OTHER PUBLICATIONS

Shostakovskii et al., Chem. Abs., 58 (1963), pp. 6934b.

Primary Examiner—Harry Wong, Jr.
Attorney, Agent, or Firm—Oblon, Fisher, Spivak, McClelland & Maier

[57] ABSTRACT

A fluorocopolymer is produced by copolymerizing a fluoroolefin and cyclohexyl vinyl ether in the presence of a polymerization initiator at −30° to +150° C. at a molar ratio of the fluoroolefin to cyclohexyl vinyl ether in charge of 95:5 to 5:95.

4 Claims, No Drawings

PROCESS FOR PRODUCING FLUOROCOPOLYMER

BACKGROUND OF THE INVENTION

1. Field of the Invention

The present invention relates to a process for producing fluorocopolymer. More particularly, it relates to a process for producing a novel fluorocopolymer having high rigidity and being soluble in usual solvents by copolymerizing a fluoroolefin and cyclohexyl vinyl ether.

2. Description of the Prior Arts

It has been known to obtain copolymers of a fluoroolefin and an alkyl vinyl ether or an unsaturated alkyl vinyl ether, for example, in U.S. Pat. No. 2,834,767 wherein methyl vinyl ether, ethyl vinyl ether, n-butyl vinyl ether, isobutyl vinyl ether, t-butyl vinyl ether, 2-ethylhexyl vinyl ether, 2-chloroethyl vinyl ether, 2-methoxyethyl vinyl ether and 2-butyoxyethyl vinyl ether are described as the vinyl ethers.

However, it has not been known to obtain a copolymer of a fluoroolefin and a cycloalkyl vinyl ether.

The conventional copolymers of a fluoroolefin especially tetrafluoroethylene and an alkyl vinyl ether or an unsaturated alkyl vinyl ether commonly have low rigidity and have elastomeric characteristics.

The inventors have studied and found comonomers for fluoroolefins to form copolymers which have high rigidity and are soluble in usual solvents and are used as coating resins which are easily processed and hardened and form hard coating layers (solvent insoluble and infusible).

SUMMARY OF THE INVENTION

It is an object of the present invention to provide fluorocopolymers having high rigidity and being solvent soluble.

It is another object of the present invention to provide coating resins which are easily processed and hardened and form hard coating layers (solvent insoluble and infusible).

It is the other object of the present invention to provide a process for producing the fluorocopolymers having high rigidity and being solvent soluble which can be used as coating resins which are easily processed and hardened and form hard coating layers.

The foregoing objects of the present invention have been attained by copolymerizing a fluoroolefin and cyclohexyl vinyl ether in the presence of a polymerization initiator at $-30°$ to $+150°$ C. at a molar ratio of the fluoroolefin to the cyclohexyl vinyl ether of 95:5 to 5:95.

DETAILED DESCRIPTION OF PREFERRED EMBODIMENTS

The present invention has been attained by the above-mentioned findings.

The copolymers obtained by the process of the present invention have high rigidity and are soluble in a solvent such as mineral spirit, ethyl acetate etc. When the copolymers are used as a coating resin, the processing and hardening are easy to easily form transparent and hard coating layers.

In the process of the present invention, it is preferable to use perhaloolefin, especially tetrafluoroethylene and chlorotrifluoroethylene as the fluoroolefin.

In the process of the present invention, the molar ratio of a fluoroolefin to cyclohexyl vinyl ether in charge is usually 95:5 to 5:95. preferably 80:20 to 30:70. Because of the copolymerization characteristic, the copolymers having fluoroolefin component and cyclohexyl vinyl ether component at a molar ratio of about 1:1 are usually obtained. Since the molar ratio of the unreacted monomers is varied during the copolymerization, it it preferable to additionally charge both of the monomers at the molar ratio corresponding to the reacted monomers in order to obtain the uniform copolymer.

Thus, copolymers containing the fluoroolefin unit of 25 to 65 mole%, preferably 45 to 55 mole%, can be obtained.

It is also possible to copolymerize a fluoroolefin and a cyclohexyl vinyl ether together with a small amount of a comonomer.

Suitable comonomers include olefins such as ethylene, propylene and isobutylene; haloolefins such as vinyl chloride and vinylidene chloride; unsaturated carboxylic acid esters such as methyl methacrylate; vinyl carboxylates such as vinyl acetate and vinyl n-butyrate; and vinyl ethers such as ethyl vinyl ether, and n-butyl vinyl ether.

The comonomer can be usually added at a ratio of less than 30 mole% preferably about 0.1 to 15 mole% to the total monomers including the fluoroolefin and cyclohexyl vinyl ether.

In the process of the present invention, the polymerization initiators are not limited and can be various ones such as peroxides, azo compounds and redox type initiators and ionizing radiations. In the process of the present invention, water soluble polymerization initiators as well as oil soluble polymerization initiators can be used.

Particularly, water soluble initiators include inorganic initiators such as redox initiators of combinations of an oxidizing agent such as persulfate e.g. potassium persulfate, hydrogen peroxide and a reducing agent such as sodium hydrogen sulfite and sodium pyrosulfate; and the redox initiators adding a small amount of iron, a ferrous salt, silver nitrate etc; and organic initiators such as dibasic acid peroxides such as disuccinic acid peroxide, diglutaric acid peroxide and monosuccinic acid peroxide; and azobisisobutyl amidine etc.

The oil soluble initiators include peroxy ester type peroxides such as t-butyl peroxyisobutylate, t-butyl peroxyacetate; dialkyl peroxydicarbonates such as diisopropyl peroxydicarbonate; benzoyl peroxide; and azobisisobutyronitrile etc.

The amount of the polymerization initiator can be selected depending upon the kinds and the copolymerization conditions and it is about 0.005 to 5 wt.% especially 0.05 to 0.5 wt.% to the total monomers.

In the copolymerization of the present invention, the polymerization procedure is not limited and it can be a bulk polymerization, a suspension polymerization, an emulsion polymerization and a solution polymerization.

From the viewpoints of stable operation in the copolymerization and easy separation of the resulting copolymer, it is especially preferable to employ an emulsion polymerization in an aqueous medium or a solution polymerization in a solvent of a saturated halohydrocarbon having more than 1 fluorine atom. When the copolymerization is carried out in an aqueous medium, it is preferable to add a basic buffering agent so as to keep the pH of the solution higher than 4, preferably higher than 6.

The process of the present invention can be a batch system, a semicontinuous system, and a continuous system.

In the copolymerization of the present invention, the copolymerization temperature can be selected from the range of −30° to +150° C. depending upon kinds of the polymerization initiator and the medium for the copolymerization.

When the copolymerization is carried out in an aqueous medium, the reaction temperature is usually in a range of 0° to 100° C. preferably 10° to 90° C.

The reaction pressure can be selected as desired and it is usually in a range of 1 to 100 $Kg/cm^2$ especially 2 to 50 $Kg/cm^2$.

In the process of the present invention, the copolymerization can be effectively attained without a special high pressure. Further, it is also possible to attain the copolymerization under a special high pressure or a reduced pressure.

Thus, the fluorocopolymer of a fluoroolefin and a cyclohexyl vinyl ether can be obtained in the above-mentioned conditions.

The fluorocopolymers of the present invention have molecular weights as instrinsic viscosity of about 0.2 to 3.0 g/dl preferably 0.3 to 2.0 g/dl at 30° C. in tetrahydrofuran.

The fluorocopolymers of the present invention are novel and have high rigidity and are useful for forming transparent hard coating layers or for various molding compositions.

When the fluorocopolymer of the present invention is used as a raw material for a paint, coating layers can be prepared by various methods. A solution, a dispersion or a powder of the fluorocopolymer is coated or sprayed on a clean surface of a substrate and heated to evaporate the solvent or the medium or to melt-bond the powder. From the viewpoint of smoothness of the resulting coating layer, it is preferable to employ a method of coating the solution of the fluorocopolymer and drying it.

The resulting coating layer can be easily crosslinked by heating it at higher than 170° C. preferably 190° to 300° C. in an atmosphere containing oxygen such as air or irradiating radiation including ultraviolet rays having low wavelength of less than 270 m$\mu$ in an atmosphere containing oxygen such as air. The mechanical properties at high temperature such as strength and modulus or the solvent resistance of the coating layer can be improved. It is possible to add suitable additives such as a pigment, a stabilizer, a lubricant, a filler and others. The color tone, the heat stability, the wearing resistance, the nontackiness and the surface hardness of the coating layer may be improved by the addition of suitable additive.

The present invention will be further illustrated by reference to certain specific examples which are provided herein for purpose of illustration only and are not intended to be limiting unless otherwise specified.

EXAMPLE 1

In a 0.6 liter stainless steel reactor, 190 g of deoxidized water, 0.4 g of ammonium perfluorooctanate, 0.014 g of sodium hydrogen sulfite, 0.9 g of disodium hydrogenphosphate 12 hydrate and 40 g of cyclohexyl vinyl ether were charged, and the reactor was evacuated and 58 g of tetrafluoroethylene was charged. The mixture was stirred at 500 rpm and heated to 65° C. and then, 10 ml of an aqueous solution of ammonium persulfate (1 wt.%) was charged under nitrogen pressure into the reactor. The mixture was kept at 65°±2° C. while controlling the heating. After 10 minutes from the addition of ammonium persulfate, the rapid reduction of the pressure was initiated to reduce the initial pressure of 26.6 $Kg/cm^2$ (gauge) to 16.1 $Kg/cm^2$ (gauge) after 60 minutes. At the time, the heating and stirring were stopped and the reactor was cooled with water and the unreacted tetrafluoroethylene was discharged to stop the reaction whereby a stable emulsion containing 62.3 g of a copolymer (polymer concentration of 23.5 wt.%) was obtained.

The emulsion was added dropwise to 1 liter of ethanol under stirring to break the emulsion and the copolymer was separated by filtration and washed with water and then with ethanol and dried at 30° C. in vacuum.

It was found that the copolymer included 51.3 mole% of tetrafluoroethylene units by elementary analysis. It was found that the copolymer had high alternate arrangement by $^{19}$FNMR analysis. It was found that the copolymer had a glass transition temperature of 45° C. It was found that the copolymer had a thermal decomposition initiation temperature of 236° C. by a thermal weight reduction analysis. The instrinsic viscosity of the copolymer was 1.21 g/dl in tetrahydrofuran. The infrared spectrum of the copolymer showed strong absorptions at 2900 and 2830 $cm^{-1}$ (based on —$CH_2$—), a very strong and broad absorption near 1100 $cm^{-1}$ (based on —$CF_2$—), and medium or weak absorptions at 950, 890 860, 840, 795 $cm^{-1}$. The spectrum also showed weak absorptions as shoulders on a broad peak at 700, 660, 620, 520 $cm^{-1}$.

The copolymer was press-molded at 150° C. to obtain a transparent hard sheet having a thickness of 0.8 mm which had a tensile strength of 510 $Kg/cm^2$, an elongation at break of 1.0% and a modulus of elasticity of $9.0 \times 10^3$ $Kg/cm^2$ at room temperature.

The copolymer was soluble to mineral spirit, toluene, ethyl acetate, tetrahydrofuran, diisobutyl ketone, trichlorotrifluoroethane and chloroform.

A solution of the copolymer in ethyl acetate (25 wt.%) was coated on an aluminum plate and dried to obtain a coated layer which had an angle of contact of 83 degree, a pencil hardness of 2 H and was adhered under high adhesive strength as the result of a drawing test of 10/10 and a cross-cut test of 100/100.

EXAMPLE 2

In accordance with the process of Example 1, except using chlorotrifluoroethylene as the fluoroolefin and charging 52 g of cyclohexyl vinyl ether and 48 g of chlorotrifluoroethylene, the copolymerization was carried out for 105 minutes to obtain 63.2 g of a copolymer which had a glass transition point of 73° C., a thermal decomposition initiation temperature of 301° C. and an intrinsic viscosity of 0.58 g/dl in tetrahydrofuran.

The copolymer was press-molded at 150° C. to obtain a sheet having a thickness of 0.8 mm which had a tensile strength of 440 $Kg/cm^2$, an elongation at break of 6% and a modulus of elasticity of $10.3 \times 10^3$ $Kg/cm^2$. The infrared spectrum of the copolymer showed strong absorptions at 2910 and 2830 $cm^{-1}$ (based on —$CH_2$—), a very strong and broad absorption near 1160 $cm^{-1}$ (based on —$CF_2$—), and medium or weak absorptions at 950, 890, 860, 845, 800 $cm^{-1}$ and near 600 $cm^{-1}$ (broad).

A solution of the copolymer in ethyl acetate (25 wt.%) was coated on an aluminum plate and dried to obtain a coated layer which had a pencil hardness of 2 H and was adhered under high adhesive strength as the results of a drawing test of 10/10 and a cross-cut test of 100/100.

The solution was overspread on a glass plate and heated at 138° C. for 30 minutes to evaporate the solvent. The resulting coating layer had a tensile modulus of 13 Kg/cm² at 100° C. The coating layer was soluble in tetrahydrofuran. The coating layer was further heated at 233° C. for 10 minutes to form the layer having a modulus of elasticity of 590 Kg/cm² at 100° C. The layer was insoluble in tetrahydrofuran. This shows the fact of the crosslinkage.

EXAMPLES 3 to 6

In a 60 ml stainless steel reactor, 10 g of deoxidized water, 0.1 g of ammonium perfluoroctanoate, 0.014 g of sodium hydrogensulfite, 0.36 g of disodium hydrogenphosphate 12 hydrate and the specific amounts of tetrafluoroethylene and cyclohexyl vinyl ether were charged and the reactor was shaken in a constant temperature bath at 65° C. to prepare copolymers. The yields and the characteristics of the copolymers are shown in Table 1.

Table 1

| Example | 3 | 4 | 5 | 6 |
|---|---|---|---|---|
| Charge (g) | | | | |
| TFE* | 9.0 | 8.0 | 6.1 | 4.0 |
| c.HyVE** | 1.0 | 2.0 | 4.0 | 6.0 |
| Reaction time (hrs) | 3.2 | 2.0 | 1.3 | 1.3 |
| Yield (g) | 1.8 | 3.9 | 6.0 | 7.9 |
| Composition (TFE mole %) | 71.6 | 60.8 | 50.3 | 47.2 |
| Glass transition point (° C.) | — | 44 | 47 | 51 |
| Thermal decomposition initiation point (° C.) | 235 | 226 | 213 | 207 |

Note:
* TFE: tetrafluoroethylene
** c.HyVE: cyclohexyl vinyl ether

EXAMPLE 7

In a 60 ml stainless steel reactor, 20 g of deoxidized water 0.04 g of ammonium perfluorooctanoate, 0.18 g of disodium hydrogenphosphate 12 hydrate, 0.5 g of disuccinic acid peroxide, 4.8 g of chlorotrifluoroethylene and 5.2 g of cyclohexyl vinyl ether were charged. The reactor was shaken in a constant temperature bath at 75° C. for 3 hours to obtain 7.8 g of a copolymer. The copolymer had 48.2 mole % of chlorotrifluoroethylene unit.

EXAMPLE 8

In the reactor of Example 7, 15 g of trichlorotrifluoroethane, 0.01 g of t-butyl peroxyisobutyrate, 4.8 g of chlorotrifluoroethylene and 5.2 g of cyclohexyl vinyl ether were charged and the reactor was shaken in a constant temperature bath at 65° C. for 2.0 hours to carry out the copolymerization. The copolymer was obtained in a form of a solution in trichlorotrifluoroethane. The solution was added dropwise into water to separate the copolymer. The copolymer was filtered and washed with water and then with ethanol and dried at 50° C. in vacuum.

The copolymer had 48.2 mole % of chlorotrifluoroethylene units and a glass transition point of 72° C. and a thermal decomposition initiation point of 321° C.

What is claimed is:

1. A fluorocopolymer having high rigidity, and being solvent soluble which comprises
    25 to 65 mole percent of a component of a fluoroolefin monomer selected from the group consisting of tetrafluoroethylene and chlorotrifluoroethylene;
    75 to 35 mole percent of a component of a cyclohexylvinyl ether monomer; or a mixture of cyclohexylvinyl ether monomer and
    a comonomer selected from the group consisting of olefin, halo olefin, unsaturated carboxylic acid ester, vinyl carboxylate and alkyl vinyl ether monomers; wherein said component of said comonomer is present in an amount less than 30 mole percent of the total amount of said fluoroolefin and said cyclohexyl vinyl ether monomers.

2. A fluorocopolymer according to claim 1, wherein the amount of the component of said fluoroolefin monomer is 45–55 mole percent.

3. A fluorocopolymer according to claim 1, wherein the component of said fluoroolefin monomer is a component of tetrafluoroethylene.

4. A fluorocopolymer according to claim 1, wherein the component of said fluoroolefin monomer is a component of chlorotrifluoroethylene.

* * * * *